United States Patent [19]
Nishida et al.

[11] Patent Number: 6,061,116
[45] Date of Patent: May 9, 2000

[54] HOMEOTROPIC SPRAYED-NEMATIC LIQUID CRYSTAL DISPLAY DEVICE

[75] Inventors: Susumu Nishida, Kanagawa; Hiroki Takahashi, Tokyo; Hideo Saito; Shizuo Murata, both of Chiba, all of Japan

[73] Assignee: Chisso Corporation, Osaka, Japan

[21] Appl. No.: 09/043,698

[22] PCT Filed: Sep. 26, 1996

[86] PCT No.: PCT/JP96/02785

§ 371 Date: Aug. 19, 1998

§ 102(e) Date: Aug. 19, 1998

[87] PCT Pub. No.: WO97/12275

PCT Pub. Date: Apr. 3, 1997

[30] Foreign Application Priority Data

Sep. 26, 1995 [JP] Japan ................................. 7-273562

[51] Int. Cl.[7] ...................... G02F 1/1337; G02F 1/1335; C09R 19/04
[52] U.S. Cl. ...................... 349/130; 349/117; 349/121; 349/125; 349/126; 349/178; 252/299.01; 252/299.6
[58] Field of Search ............... 252/299.01; 349/117, 349/121, 125, 126, 130, 131, 178, 186

[56] References Cited

U.S. PATENT DOCUMENTS 5,621,558  4/1997  Shimada et al. .................... 349/130

FOREIGN PATENT DOCUMENTS

| | | |
|---|---|---|
| 2-176625 | 7/1990 | Japan . |
| 3-209440 | 9/1991 | Japan . |
| 6-082777 | 3/1994 | Japan . |

*Primary Examiner*—Shean C. Wu
*Attorney, Agent, or Firm*—Wenderoth, Lind & Ponack, L.L.P.

[57] ABSTRACT

In a liquid crystal display device including (1) a pair of substrates on the surface of which a transparent electrode and an alignment film are formed in turn, and the alignment films are arranged with a gap so that the films face each other, (2) a liquid crystal which fills the gap, (3) two polarizer plates holding the pair of substrates between them, and (4) a driving circuit connected to the transparent electrodes for applying a voltage between both substrates, the improved display device including a vertically arranged splayed nematic liquid crystal wherein a nematic liquid crystal which is substantially free from a chiral liquid crystalline compound and has a negative dielectric anisotropy is used as the liquid crystal; molecules of the liquid crystal between the pair of the substrates are oriented so that their molecular axis are arranged on planes orthogonal to the substrates; liquid crystal molecules, in the vicinity of the surface of the substrates, are oriented vertically or semi-vertically so that the angle between the axis of the molecules and the substrates is in the range of 90 to 45°; and liquid crystal molecules, in other portions, are oriented so that the angle between the axis of the molecules and the substrates becomes gradually smaller as the position of the molecules approaches the center portion of the gap between the substrates, and the axis becomes substantially parallel to the substrates in the center portion of the gap between the substrates.

9 Claims, 13 Drawing Sheets

Viewing angle characteristic
in the direction of upper/lower

Viewing angle characteristic
in the direction of left/right

Viewing angle characteristic
in the direction of upper/lower

Viewing angle characteristic
in the direction of left/right

HOMEOTROPIC SPRAYED-NEMATIC LIQUID CRYSTAL DISPLAY DEVICE

This application is a 371 of PCT/JP96/02785, filed Sep. 26, 1996.

TECHNICAL FIELD

The present invention relates to a liquid crystal display device. Particularly, it relates to a display device which includes a vertically arranged splayed nematic liquid crystal, and birefringence function of molecules of which liquid crystal can be controlled with voltage.

BACKGROUND ART

Heretofore, as the liquid crystal display device employing electrooptical effect, there have been developed many devices using a cell such as a DSM cell employing dynamic scattering effect, guest-host cell using a coloring matter, TN cell having a twisted nematic structure, SBE (Super-Twisted Birefringence Effect) cell, and STN (Super-Twisted Nematic) cell. Among these, most generally used liquid crystal display devices are based on Schadt, Helfrich effect using a nematic liquid crystal exhibiting positive dielectric anisotropy, and the liquid crystal has a twisted nematic structure. Recently, OCB (Optically Compensated Bend) cells having a wide viewing angle have been proposed as a mode which is close to practical use (Miyashita et al., Euro-Display '93 Digest, pp 149–152).

As display devices which use a liquid crystal material having negative dielectric anisotropy, ECB (Electrically Controlled Birefringence) type liquid crystal display devices employing electrically controlled birefringence effect are generally known. The devices are to employ the change in light transmission by effectively varying birefringence due to the deformation of a nematic layer having a negative dielectric anisotropy, in an electric field. The mode in which a new orientation control is added to the ECB mode and an optical compensation plate is used is a SH (Super-Homeotropic: Yamauchi et al., SID '89 Digest, pp 378–381) mode.

In these modes, display devices which use a liquid crystal material having positive dielectric anisotropy have a narrow viewing angle and an insufficient response speed. Also, ECB type liquid crystal display devices which employ negative dielectric anisotropy have such problems that response is slow, that steepness is poor, and that threshold voltage is high.

DISCLOSURE OF THE INVENTION

Whereas STN cell have recently come to be used for the first time as information terminals of personal computers and others, and it made actualization of large display devices of a highly definite picture possible, dependency on a viewing angle and an insufficient response speed are pointed out. In the case of large cells, also there is a problem in such an aspect of manufacturing process as grinding of glass substrates for obtaining uniform cell thickness. On the other hand, active matrix type cells in which a switch is provided for every picture segment are considered as prospective ones for display devices for future color personal computers, and have been remarkably improved in response speed. However, the problem is not yet sufficiently solved that they have a large dependency on a viewing angle which is peculiar to TN cells. As the mode in which dependency on viewing angle is improved, OCB (Optically Compensated Bend) cells are also proposed. However, OCB cells have problems that since orientation of liquid crystal molecules is initially splayed, it is necessary to initially apply a high voltage for a certain period of time to stably transform the splay orientation into bend orientation, and that the OCB cells have difficulties in orientation technique.

As the mode in which a liquid crystal material having negative dielectric anisotropy is used, the ECB type liquid crystal display devices described above and devices including a SH cell which employs an optical compensation plate are known. However, the former have problems that response speed is slow, that steepness is poor, and that voltage is high, and the latter have a problem that response speed is slow whereas monochromatic display is possible and dependency on viewing angle is improved.

The present invention is to cope with the problems in conventional technology, and thus one of its objects is to provide liquid crystal display devices background of which is achromatic and bright, and which are excellent in range of visibility, and with which a high contrast, a wide viewing angle, and high speed response are possible.

Aspects of the invention claimed in the present application are as follows:

(1) In a liquid crystal display device including
   a pair of substrates on the surface of which a transparent electrode and an alignment film are formed in turn, and the alignment films are arranged with a gap so that the films face each other,
   a liquid crystal which fills the gap,
   two polarizer plates holding the pair of the substrates between them, and
   a driving circuit connected to the transparent electrodes for applying a voltage between both substrates,
   the improved display device including a vertically arranged splayed nematic liquid crystal wherein
   a nematic liquid crystal which is substantially free from a chiral liquid crystalline compound and has a negative dielectric anisotropy is used as the liquid crystal,
   liquid crystal molecules placed between the pair of the substrates are oriented so that their molecular axis are arranged on a plane orthogonal to the substrate, (or the plane on which liquid crystal molecules are splayed is arranged orthogonal in the substrate)
   liquid crystal molecules, in the vicinity of the surface of the substrates, are oriented vertically or semi-vertically so that the angle between the axis of the molecules and the substrates is in the range of 90 to 45°, and
   liquid crystal molecules, in other portions, are oriented so that the angle between the axis of the molecules and the substrates becomes gradually smaller as the position of the molecules approaches to the center portion of the gap between the substrates, and the axis becomes substantially parallel to the substrates in the center portion of the gap between the substrates.

(2) The display device including a vertically arranged splayed nematic liquid crystal recited in the aspect (1) described above wherein the transmission axis of one of polarizer plates is arranged in the direction of substantially 45° to the plane on which the axis of the liquid crystal molecules are arranged, and the transmission axis of the other of the polarizer plates is arranged substantially parallel or right angle to the transmission axis of the one of the polarizer plates.

(3) The display device including a vertically arranged splayed nematic liquid crystal recited in the aspect (1) or (2) described above wherein the liquid crystal is a composition of liquid crystalline compounds comprising at least three kind of components and having negative dielectric anisotropy, and at least two kind of the components are compounds having a structural portion expressed by and selected from any one of the following formulas 1 to 5.

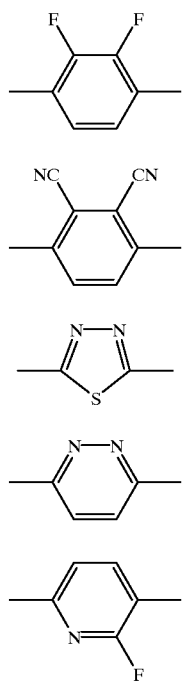

Formula 1

Formula 2

Formula 3

Formula 4

Formula 5

(4) The display device including a vertically arranged splayed nematic liquid crystal recited in any one of the aspects (1) to (3) described above wherein substrates on which a film of SiOx by an oblique evaporation, a film of a polymer, or film of a polysilane compound is formed at the side which faces the liquid crystal molecules, or substrates which were prepared by subjecting the film formed on the substrates defined just above to a rubbing treatment are used.

(5) The display device including a vertically arranged splayed nematic liquid crystal recited in any one of the aspects (1) to (4) described above wherein the device further includes optical compensating plate(s) having optical anisotropy and arranged between the polarizer plate and the substrate.

Liquid crystal display devices of the present invention are to control the birefringence function of liquid crystal molecule with voltage, and specifically, the devices are to employ the electrooptical effect described below. The present invention will be described in detail with reference to drawings.

BRIEF DESCRIPTION OF THE DRAWINGS

In FIG. 1, each of referential numerals 1 and 10 is a polarizer plate, 11 is an optical compensation plate, 2 and 9 are substrates, 3 and 8 are transparent electrodes, 4 and 7 are alignment films, 5 is a liquid crystal, and 6 is a sealing material.

Specifically, FIG. 1 shows a diagrammatic cross-section of a liquid crystal cell used in the liquid crystal display devices of the present invention. In the Figure, transparent electrodes 3 and 8, and alignment films 4 and 7 are formed, in turn, on the inside surface of a pair of substrates 2 and 9 arranged facing with each other, respectively. Between the substrates, liquid crystal 5 is filled by means of sealing material 6. Between transparent electrodes 3 and 8, a driving circuit for applying a voltage to the electrodes is provided. Two polarizer plates 1 and 10 are further provided so that they hold a pair of substrates 2 and 9 between them. Also, optical compensation plate 11 is provided between substrate 2 and polarizer plate 1. In the Figure, 5A indicates a liquid crystal molecule.

FIG. 2 is an explanatory drawing of a liquid crystal display device including a liquid crystal cell shown in FIG. 1. In FIG. 2, $\theta_0$ indicates a tilt angle from a substrate, $\beta_1$ indicates an angle between the bearing angle (azimuth) of liquid crystal molecules and the transmission axis of a lower polarizer plate, and $\beta_2$ indicates an angle between the bearing angle of liquid crystal molecules and the transmission axis of an upper polarizer plate.

Figure 2:
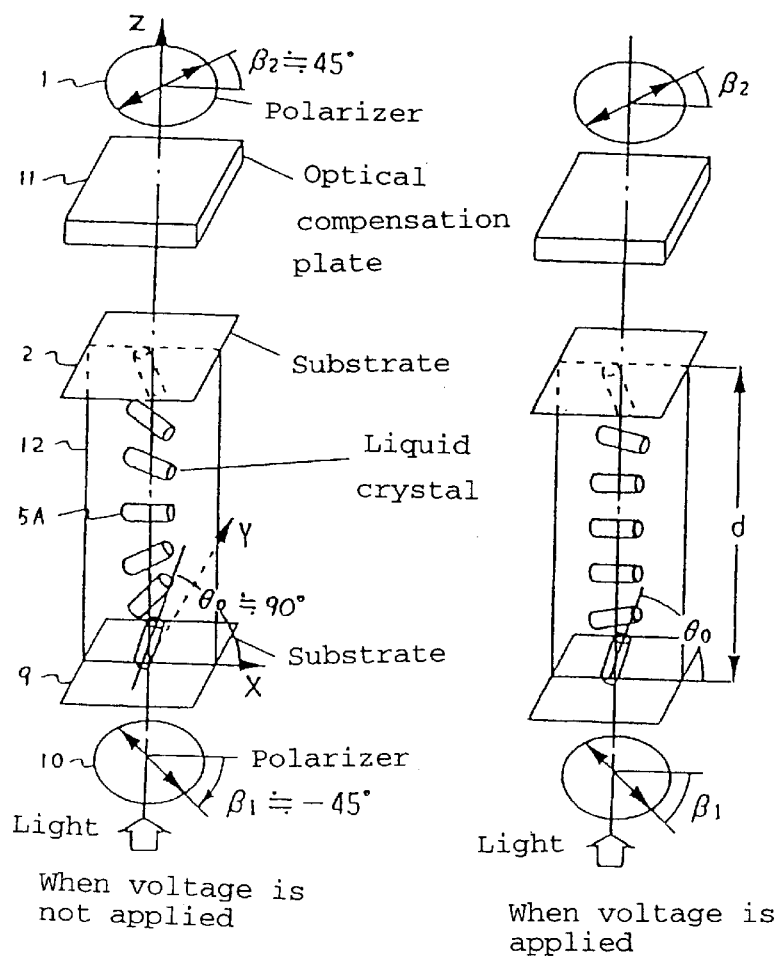
FIG. 2 is an explanatory view showing the structure of a liquid crystal display device of the present invention including the liquid crystal cell shown in FIG. 1.

In the liquid crystal display device shown in FIG. 2, a nematic liquid crystal which is substantially free from a chiral liquid crystalline compound and has negative dielectric anisotropy is used as liquid crystal 5 (5A), liquid crystal molecule 5A placed between both substrates 2 and 9 is oriented so that its molecular axis is arranged on hypothetical plane 12 which is orthogonal to the substrate. In the vicinity of substrate 2 or 9, liquid crystal molecules are oriented vertically or semi-vertically so that the angle of the molecular axis is 90 to 45° and preferably 90 to 70° relative to the substrate. In other portions, liquid crystal molecules are oriented so that the angle between the axis of liquid crystal molecules and the substrate becomes gradually smaller as the position of the molecule approaches to the center portion between both substrates, and the axis becomes parallel to the substrate at the center portion of the gap between both substrates. That is, liquid crystal molecules between upper substrate 2 and lower substrate 9 are arranged, without twist in orientation axis, on the same direction, namely, on hypothetical plane 12, in such a splayed way that liquid crystal molecule 5A at the center portion is oriented in substantially parallel to the substrate and the molecules are oriented in the direction of more vertical as the position of molecules approaches the substrate, as shown in FIG. 2. At both of the side where light enters and that where light exits, polarizers 10 and 1 are disposed, respectively. Angle ($\beta_1$) of transmission axis of polarizer 10 at the side of light incidence is adjusted to 45° relative to the plane (XZ plane) of the bearing angle of liquid crystal molecules, and polarizer (analyzer) 1 at the side of light exiting is arranged so that the transmission axis of the polarizer 1 is orthogonal (at angle $\beta_2$) to that of the polarizer 10. However, polarizer 1 at the side of light exiting may be arranged in parallel to angle $\beta_1$ of polarizer 10 at the side of light incidence.

As the method for attaining the vertical or semi-vertical orientation described above, a method which uses substrates on which SiOx is deposited by an oblique evaporation, or a polymer or a polysilane is coated; a method which uses substrates prepared by rubbing the surface of the deposited or coated film on those substrate; and a method which uses those methods in combination can be mentioned.

As substrate, while glass substrates are generally used and transparent substrates of a plastic such as polycarbonate may be used, it is not limited to those substrates.

Figure 1:
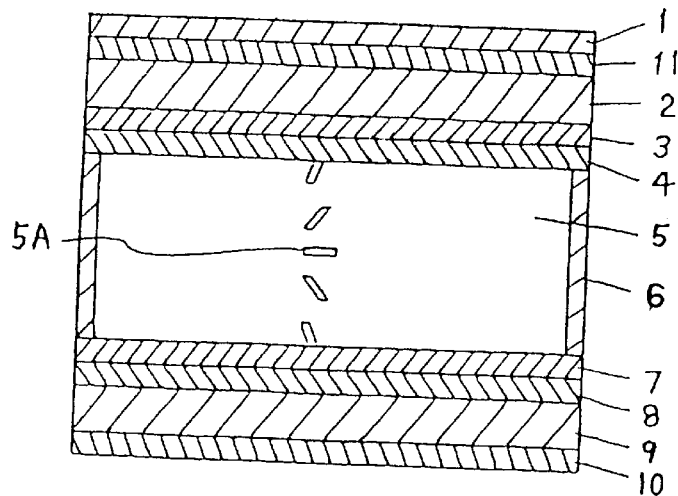
FIG. 1 is a schematic cross-sectional view of a liquid crystal cell used in the liquid crystal display devices of the present invention.

Now, the principle of the present invention will be described with reference to FIGS. 1 and 2. In order to simplify the explanation, the case where an optical compensation plate is not used in FIGS. 1 and 2 is first discussed. Optical characteristic, that is, light transmission T (V) of the cell can be expressed by the following equation when a medium having a uniaxial birefringence was placed under an orthogonal Nicol prism and a driving voltage was assumed to be V:

$$T(V0=\sin^2\{\pi d\Delta n(V)/\lambda\}\times 100(\%)$$

wherein d is cell thickness, $\Delta n(V)$ is average value of optical anisotropy $\Delta n$ along the pass of light when driving voltage is V, and $\lambda$ is wave length of the light.

In a qualitative discussion on light transmission, incident light is converted with a polarizer into straight-line polarized light. However, since the direction of the straight-line polarized light is different from the bearing angle of liquid crystal molecules, the condition of the incident light varies as it progresses through a liquid crystal layer. That is, it is possible to vary the conditions of polarization of light which passes through the liquid crystal, by changing the conditions of orientation of liquid crystal molecules by applying voltage. In other words, it is possible to vary light transmission by controlling average optical anisotropy of liquid crystal layer.

As will be understood from FIG. 2, the cell has a symmetrical structure relative to liquid crystal molecule 5A in the center portion, between right and left sides, and upper and lower sides, in the Figure, except for an optical compensation plate. That is, when X axis and y axis were assumed to be coordinate axes on a substrate, and Z axis was assumed to be a coordinate axis in the direction of cell thickness, liquid crystal molecules are oriented on the plane of X-Z axes, and thus viewing angle characteristic is symmetrical with respect to X-Z plane. In the same manner, since the cell is symmetrical between upper side and lower side relative to its center portion, viewing angle characteristic can be said to be symmetrical with respect to Y-Z axes. This fact means an improvement in the dependency on viewing angle which is a defect of conventional TN cells.

Figure 3:
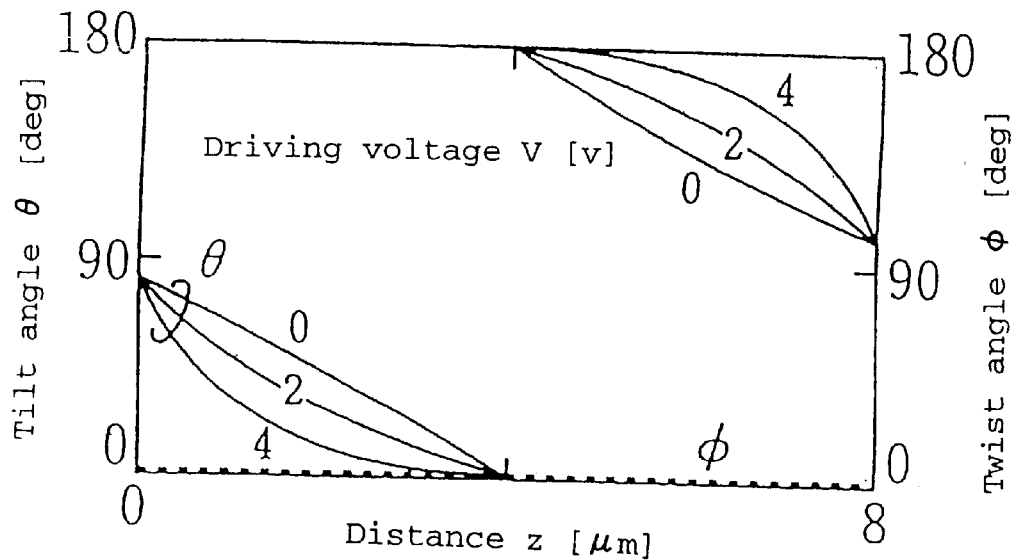
FIG. 3 is a graph and an explanatory drawing showing the change in orientation of liquid crystal molecules in a splay mode when a voltage was applied.
Figure 3:
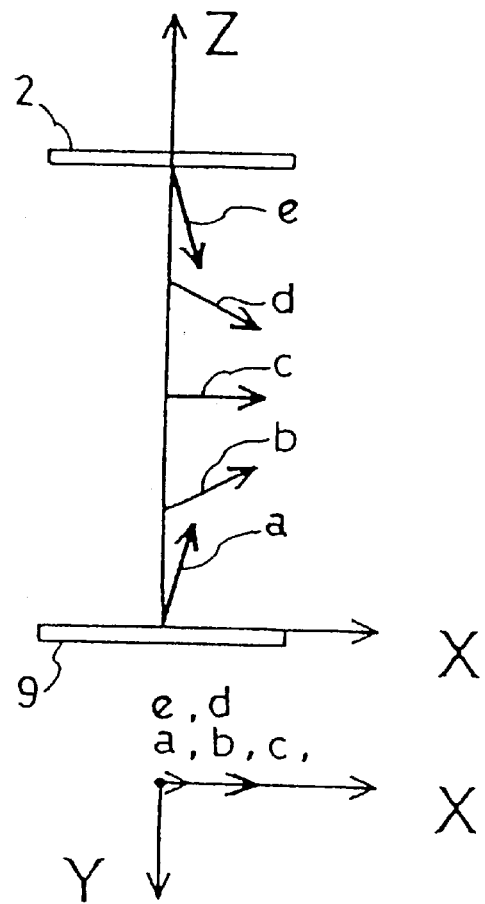
Figure 4:
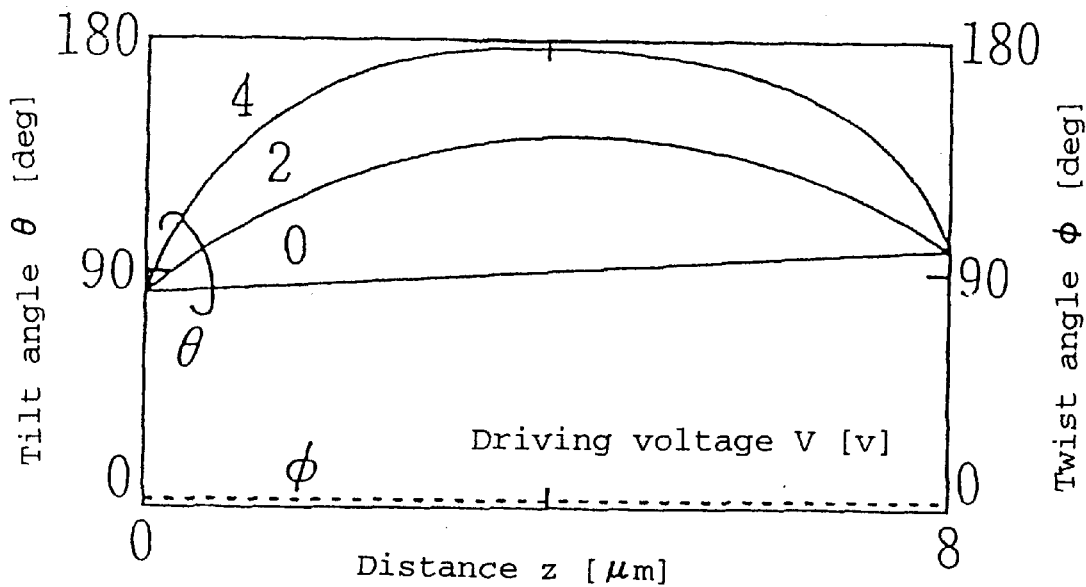
FIG. 4 is a graph and an explanatory drawing showing the distribution of orientation of liquid crystal molecules in a bend mode.
Figure 4:
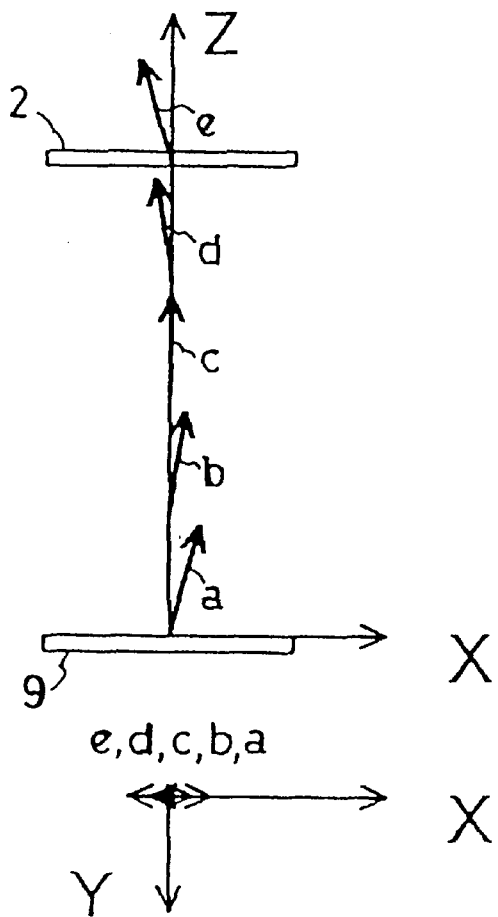
Figure 5:
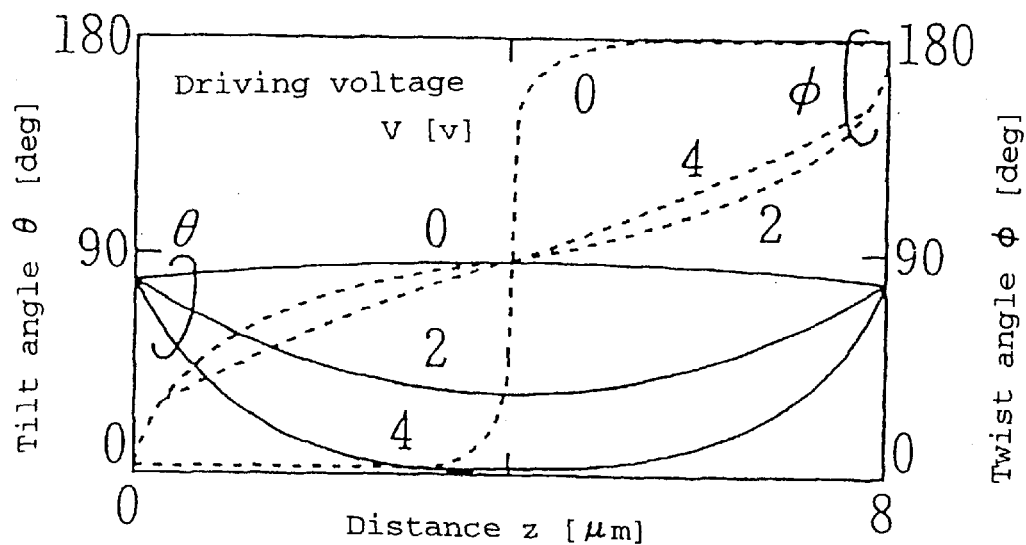
FIG. 5 is a graph and an explanatory drawing showing the distribution of orientation of liquid crystal molecules in a π-twist mode.
Figure 5:
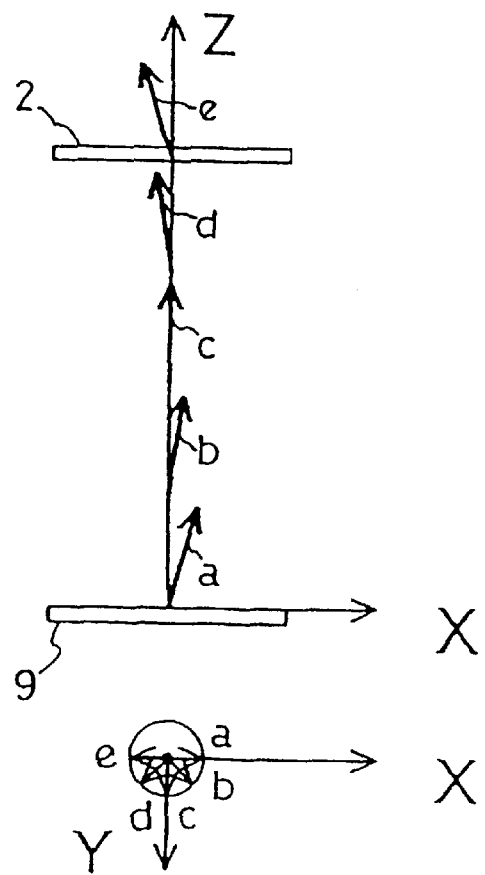

When pretilt angle $\theta_0$ of liquid crystal molecules in the vicinity of the surface of the substrate was decided as shown in FIG. 2, a plural number of orientation modes exist under the same substrate conditions. When voltage is not applied, three type of orientation modes, splay, bend, and $\pi$-twist, which have a comparatively small Gibbs free energy, appear. As an example, the conditions of orientation in a splay mode when the cell was observed from the direction of Y axis in the case where $\theta_{01}$ was adjusted to 80° and $\theta_{02}$ was adjusted to −80° is shown in FIG. 3, and the conditions of the orientation in a bend mode and $\pi$-twist mode are shown in FIGS. 4 and 5, respectively. In these Figures, z indicates the distance ($\mu$m) in the direction of thickness in a liquid crystal cell, $\theta$ does a tilt angle (degree) of a liquid crystal molecule, $\phi$ does a twist angle (degree) of a liquid crystal molecule on a plane parallel to the substrate, X does an axis at bearing angle of liquid crystal molecules parallel to the substrate, Y does an axis parallel to the substrate and orthogonal to X axis, Z does an axis orthogonal to the substrate and in the direction of cell thickness, and arrows a, b, c, d, and e indicate orientation vector of a liquid crystal molecule.

Figure 6:
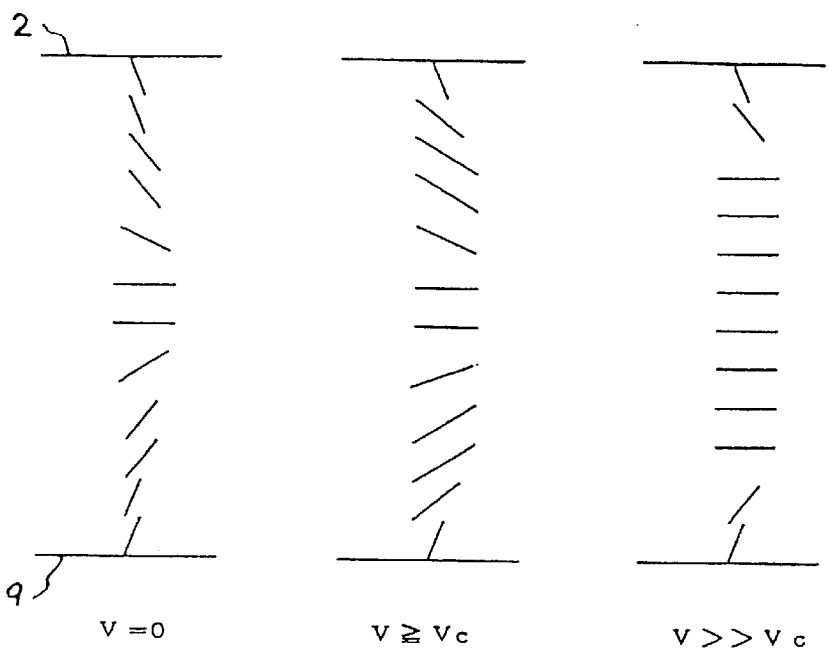
FIG. 6 is an explanatory drawing showing the change in orientation of liquid crystal molecules in a splay mode when a voltage was applied.

Next, the state in which orientation in a splay mode varies when a voltage was applied is shown in FIG. 6. In FIG. 6, reference numerals 2 and 9 represent substrates, V indicates a driving voltage, and Vc indicates critical voltage. When a voltage was applied on a liquid crystal material having a negative dielectric anisotropy and filled between substrates, a torque is applied on liquid crystal molecules to try to make the major axis of the molecules orient vertically to electric field, and almost all molecules except for those in the vicinity of the surface of the substrate are arranged parallel to the substrate.

Figure 7:
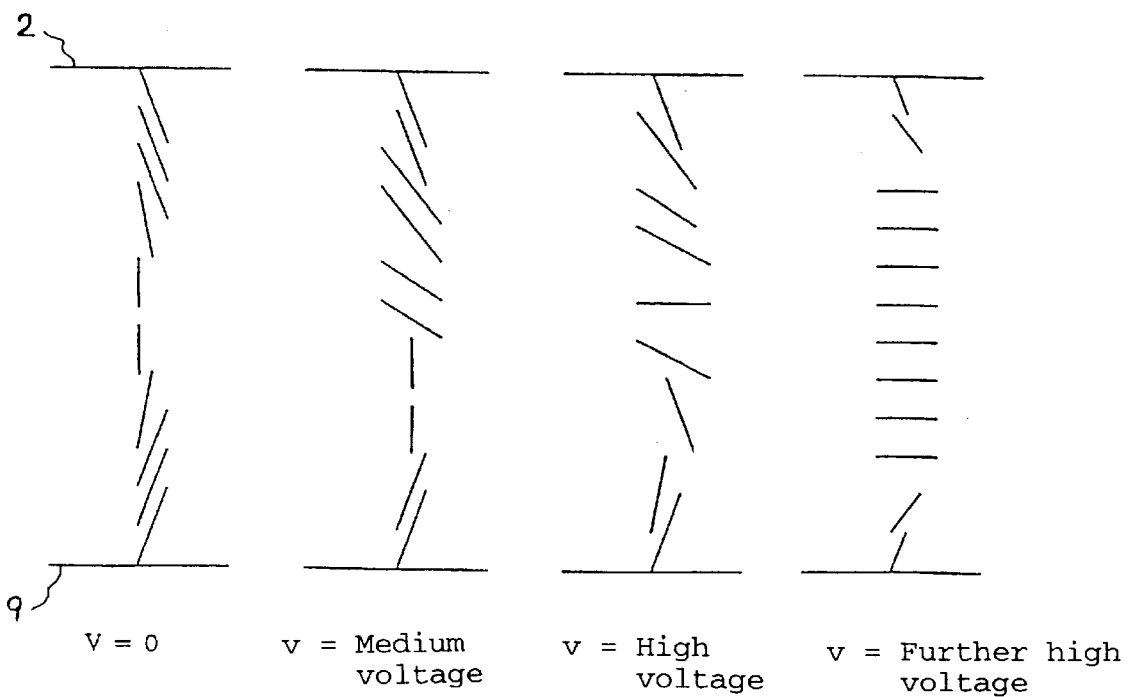
FIG. 7 is an explanatory drawing showing the fact that the orientation of liquid crystal molecules in a bend mode transforms into that of splay mode as applied voltage is increased.

The state of orientation in a bend mode when voltage is applied is shown in FIG. 7. In the bend mode, orientation becomes unstable in the vicinity of the substrate as voltage is gradually increased, and the orientation is transformed into a splay mode as a whole of the cell.

With respect to π-twist mode, there exist twist modes of a righthanded rotation and a lefthanded rotation. Since the free energy of the righthanded and lefthanded rotation modes are equal when voltage is applied, either rotation may occur. In order to produce a righthanded rotation, it is sufficient to add a chiral agent in a concentration necessary to convert inherent twist into a righthanded rotation.

Figure 8:
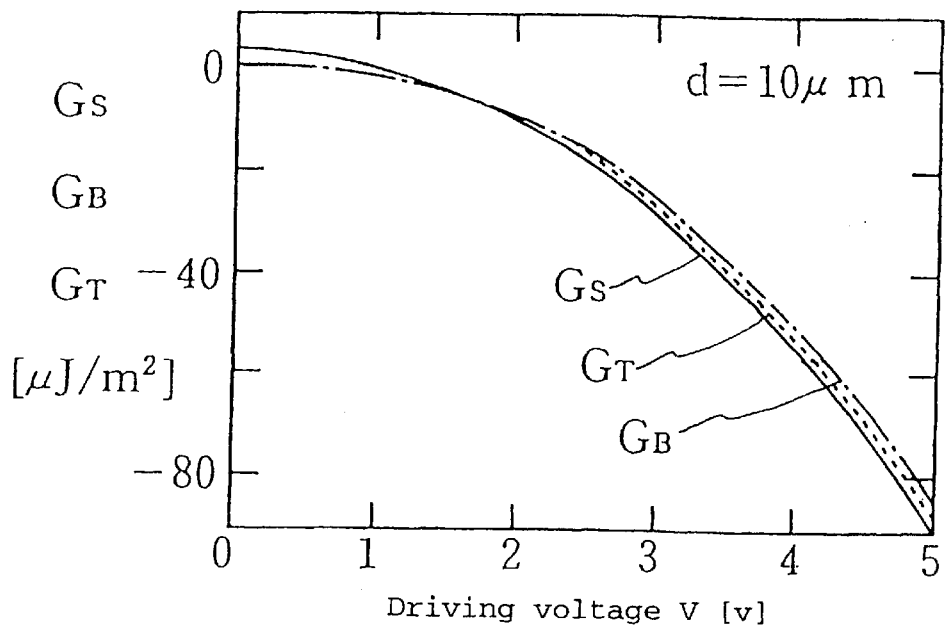
FIG. 8 is a graph showing the results of calculation of Gibbs free energy of liquid crystal molecules in three type of orientation modes.

These three type of orientations are decided by free energy within the cell. Then, the free energy in the cell was calculated by using Gibbs free energy. As examples, Gibbs free energy of each of the orientation modes was calculated on the assumption that dielectric anisotropy $\Delta\epsilon$ of a liquid crystal is −5.4, dielectric constant in major direction $\epsilon\|$ is 4.5, values of each of elastic constants, $K_{11}$ is 8 pN, $K_{22}$ is 6 pN, and $K_{33}$ is 10 pN, twist angle is 0°, cell thickness is 10 μm, $\theta_{01}$ is 80°, and $\theta_{02}$ is −80° and the results are shown in FIG. 8. In FIG. 8, GS represents free energy in a splay mode when a voltage is applied, GB represents free energy in a bend mode when a voltage is applied, and GT represents free energy in a π twist mode when a voltage is applied. Difference in energy between the splay mode and bend mode, and between the splay mode and π twist mode are shown in FIG. 9.

Figure 9:
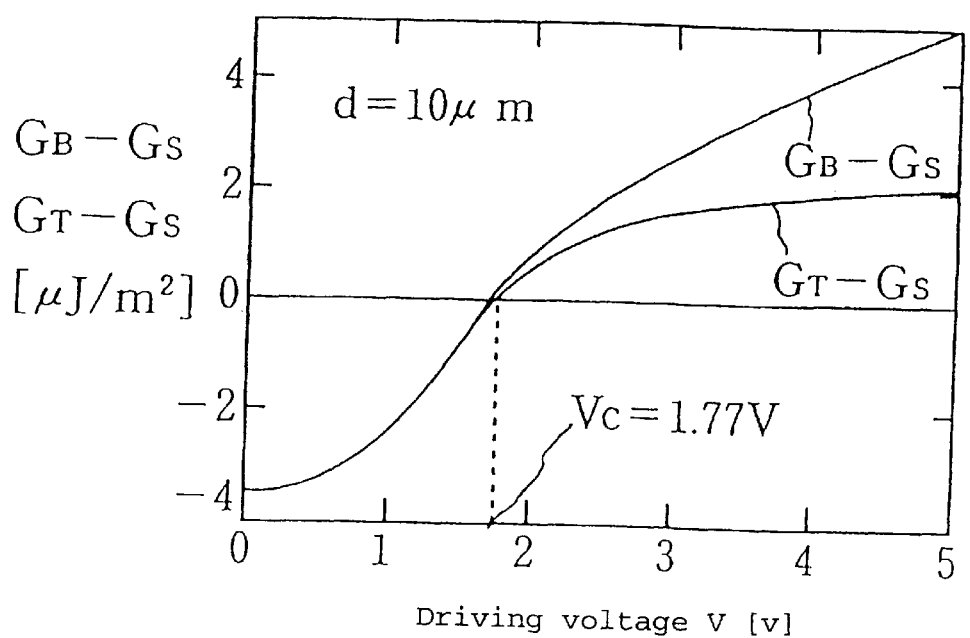
FIG. 9 is a graph showing the difference of free energy of liquid crystal molecules between a splay mode and other modes.

From FIG. 9, it can be seen that when a voltage higher than a certain value is applied, the splay mode has the smallest energy among the three type of modes. This voltage is assumed to be critical voltage Vc. In the liquid crystal described above, it can be seen that since the voltage where the splay mode crosses with the bend mode is 1.727 V and the voltage where the splay mode crosses with the π twist mode is 1.773 V, the critical voltage is 1.773 V. Display devices of the present invention including a vertically arranged splayed nematic liquid crystal are driven at a voltage of root-mean-square value (effective value) higher than the critical voltage.

Figure 10:
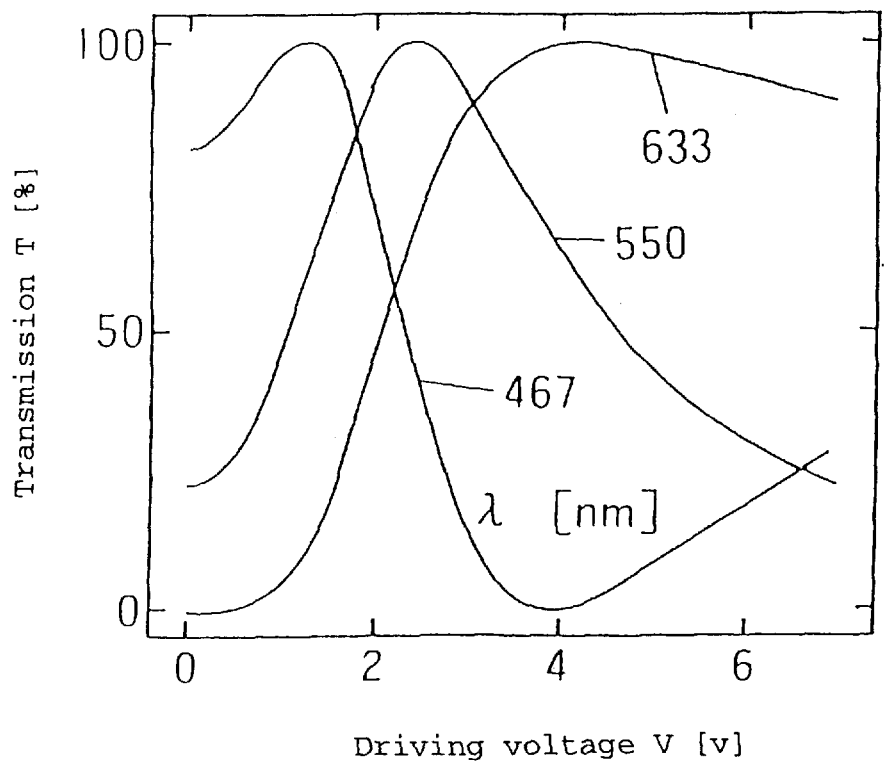
FIG. 10 is a graph showing an example of dependency of V-T characteristic on wave length when an optical compensation plate is not used.

Results of calculation on electrooptical characteristic when a cell of the splay mode is used and polarizer plates are arranged at right angle are shown in FIG. 10. In FIG. 10, since the axis of abscissa indicates driving voltage V and the axis of ordinates indicates light transmission T, the curves are called V-T characteristic. V-T characteristic was obtained in the case where it was assumed that optical anisotropy $\Delta n$ of a liquid crystal was 0.074, normal light refractive index $n_0$ was 1.491, pretilt angle $\theta_{01}$ was 75° and $\theta_{02}$ was −75°, cell thickness d was 15 μm, and polarizer plates were arranged at −45° and +45°, respectively, to the orientation plane of liquid crystal molecules. From FIG. 10, it can be seen that when the wave length of light is varied from 467 nm to 633 nm, the V-T characteristic is varied largely dependent on the wave length of light. Accordingly, in this example, it has a fear of coloring at the time when voltage is applied. However, it is possible to reduce the dependency of V-T characteristic on wave length and to make it achromatic by using a uniaxial or biaxial optical compensation plate in combination as described below, and thus, monochrome display which is available also for color display is possible.

Figure 11:
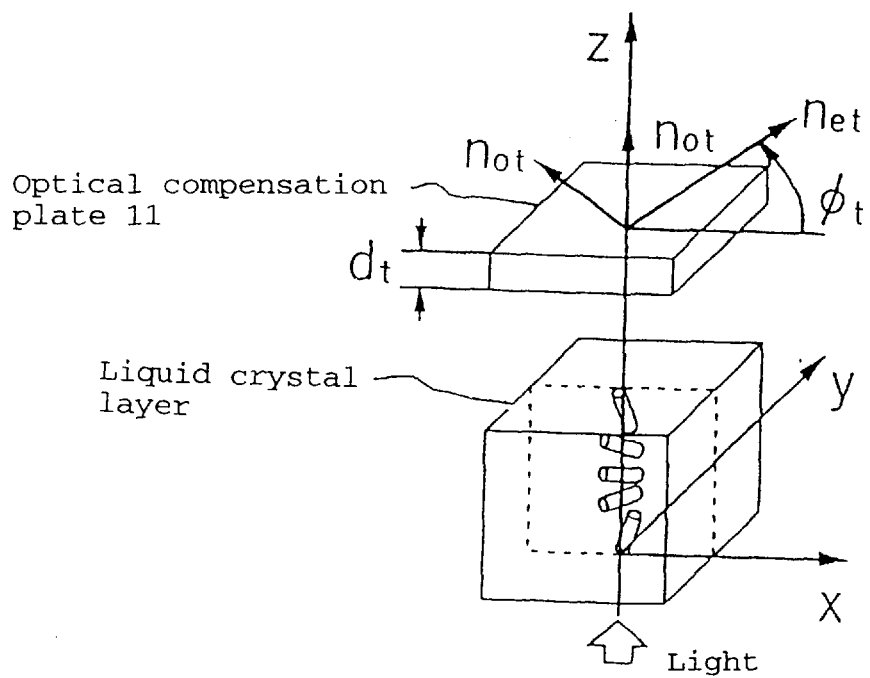
FIG. 11 is an explanatory view showing the partial structure of a cell when optical compensation plate 11 was used.

Next, the fact that the dependency of V-T characteristic on wave length can be reduced by means of an optical compensation plate having a transversal retardation is discussed. FIG. 11 shows an example in which an optical compensation plate having a transversal retardation was inserted. With respect to the optical compensation plate 11, refractive index of three main axes orthogonal with one another are Net, Not, and Not (Net>Not), and thus the plate is called uniaxially anisotropic phase difference plate. The angle of the axis showing an abnormal light refractive index Net relative to X-axis is φt, and thickness of optical compensation plate is dt. Transversal retardation Rt is expressed by the following equation:

$$Rt=(Net-Not)dt$$

Figure 12:
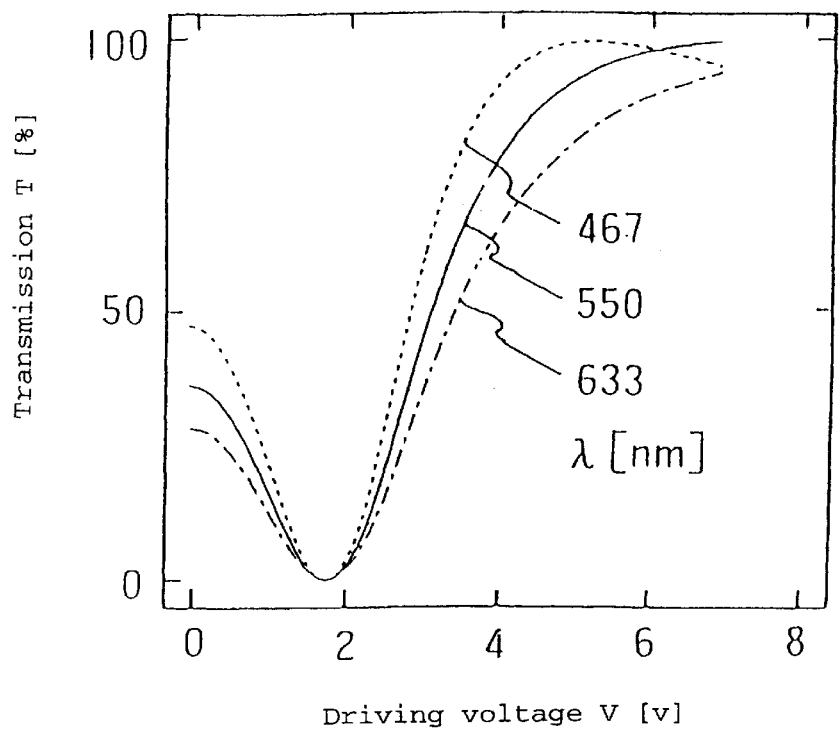
FIG. 12 is a graph showing an example of dependency of V-T characteristic on wave length when an optical compensation plate was used.
Figure 13:
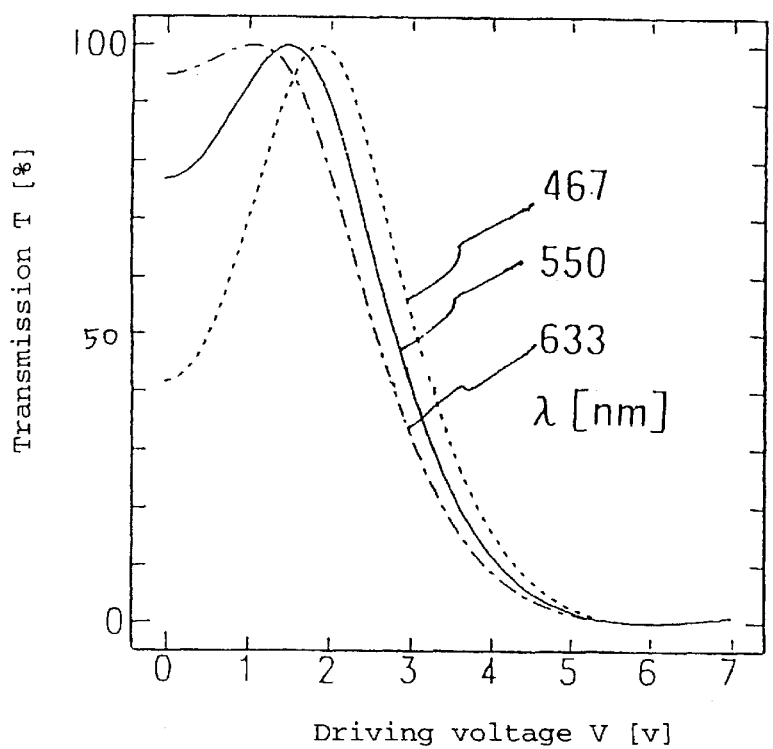
FIG. 13 is a graph showing another example of dependency of V-T characteristic on wave length when an optical compensation plate was used.

It is possible to reduce the dependency of V-T characteristic on wave length by properly selecting the values of transversal retardation Rt and φt. FIG. 12 shows the results of calculation on V-T characteristic when Rt was assumed to be 750 nm and φt was assumed to be 90° as an example. It can be seen that the dependency on wave length is reduced compared with the case of FIG. 10. FIG. 13 shows the results of calculation on V-T characteristic when Rt was assumed to be 1,000 nm and φt was assumed to be 90° as an example. V-T characteristic is reversed compared with the case of FIG. 12. V-T characteristic in FIG. 12 can be called normally black display, and V-T characteristic in FIG. 13 can be called normally white display.

Figure 14:
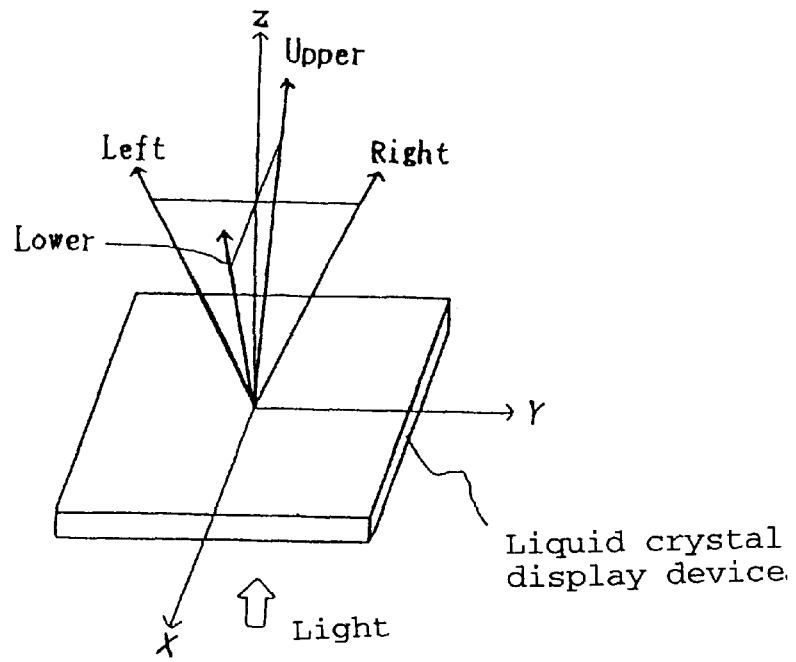
FIG. 14 is an explanatory drawing showing the definition of viewing angle used in the discussion of the characteristic of viewing angle.
Figure 15:
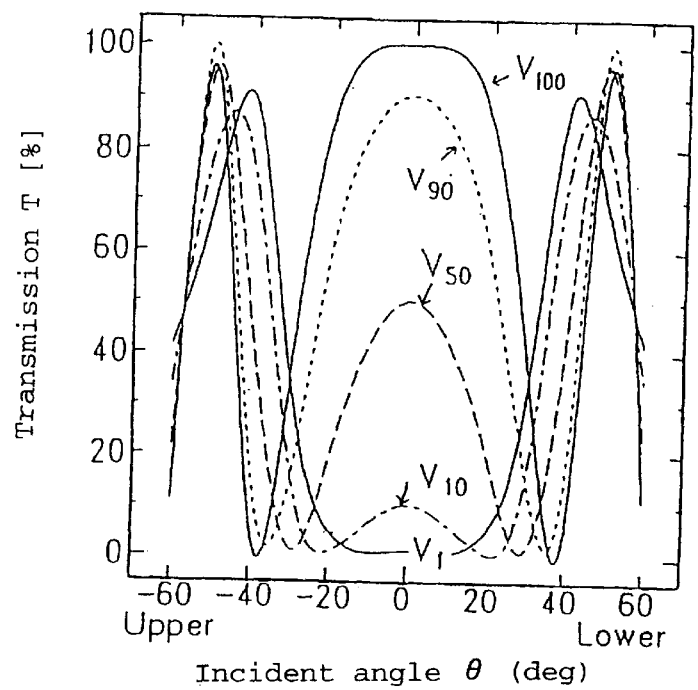
FIG. 15 is graphs showing examples of viewing angle characteristic when only an optical compensation plate was used.
Figure 15:
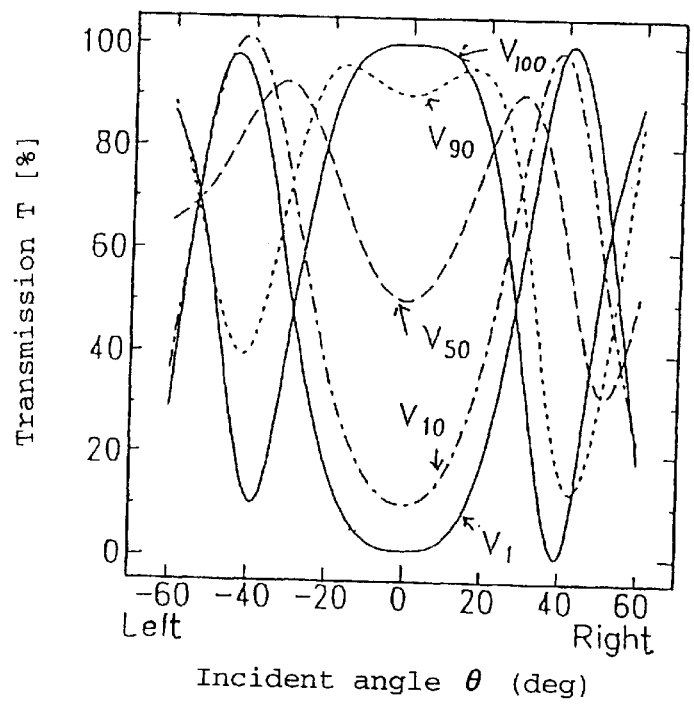

Results of calculation on a viewing angle characteristic of cell shown in FIG. 11 according to the definition of viewing angle in the viewing angle characteristic shown in FIG. 14 is shown in FIG. 15. In FIG. 15, "Upper", "Lower", "Left", and "Right" indicate viewing angles shown in FIG. 14, respectively, and "$V_1$", "$V_{10}$", "$V_{50}$", "$V_{90}$", and "$V_{100}$" indicate the driving voltage at which voltage transmission becomes 1, 10, 50, 90, and 100%, respectively, when light was vertically entered. Accordingly, FIG. 15 shows the transmission when driving voltage is kept constant. From FIG. 15, it can be seen that viewing angle characteristic of liquid crystal display devices of the present invention have a good symmetry. However, it can be seen that the angle having a good visibility is about ±15° and thus it can not be said to be so wide.

Figure 16:
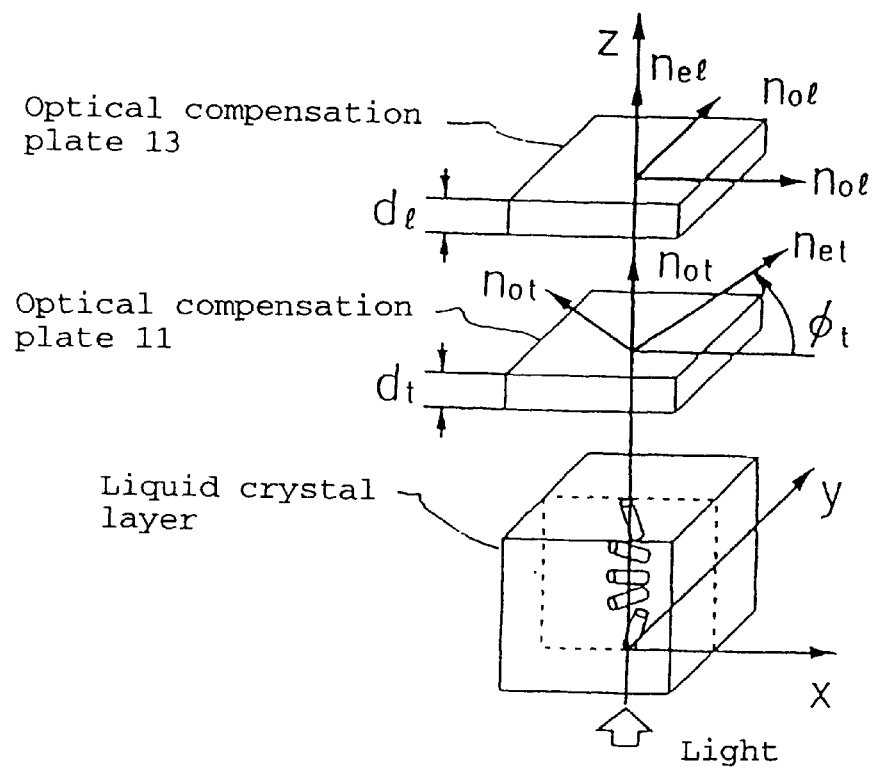
FIG. 16 is an explanatory drawing showing the partial structure of a cell when optical compensation plate 11 and optical compensation plate 13 were used.

Next, the fact that in the liquid crystal display devices of the present invention, viewing angle characteristic can be expanded by using an optical compensation plate having a longitudinal retardation together is discussed. FIG. 16 shows an example in which optical compensation plate 13 having a longitudinal retardation was inserted in addition to optical compensation plate 11 having a transversal retardation. Optical compensation plate 13 can also be called uniaxially anisotropic phase difference plate, but refractive index of three main axes orthogonal with one another are Nol, Nol, and Nel (Nel>Nol), the axis which shows an abnormal light refractive index Nel is Z-axis, and thickness is dl. Longitudinal retardation Rl can be expressed by the following equation:

$$Rl=(Nel-Nol)dl$$

Figure 17:
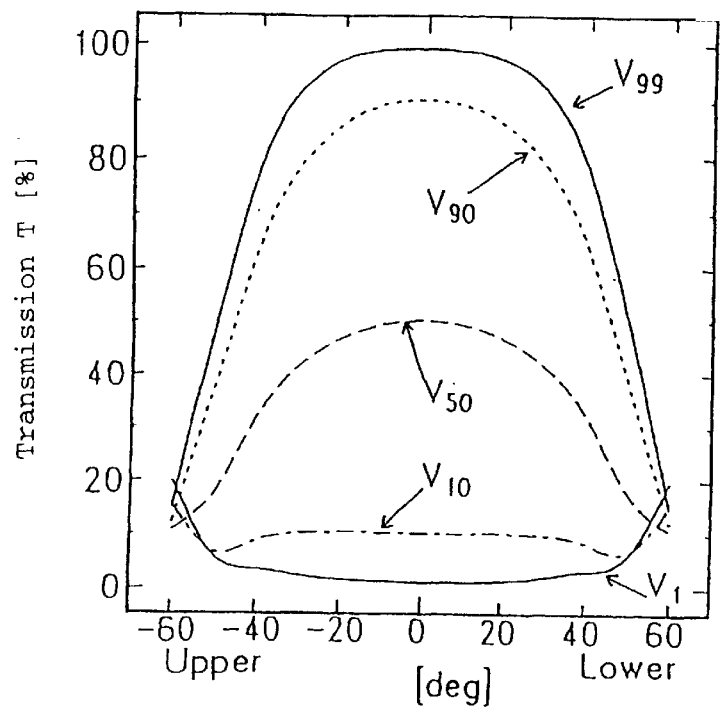
FIG. 17 is graphs showing examples of viewing angle characteristic when optical compensation plate 11 and optical compensation plate 13 were used.
Figure 17:
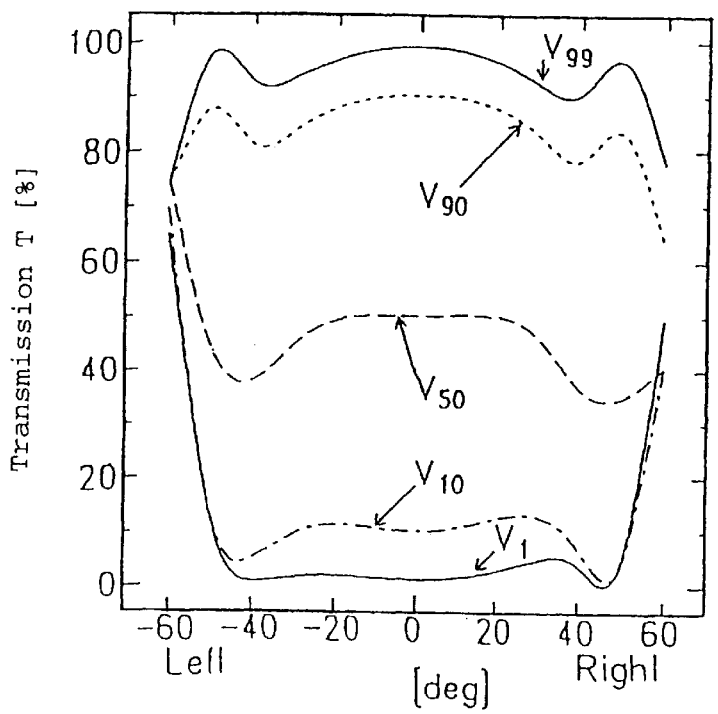

It is possible to expand the viewing angle characteristic by properly selecting the value of the longitudinal retardation Rl. FIG. 17 shows the results of calculation on viewing angle characteristic when an optical compensation plate 13 having an Rl of 1,000 nm was used together, and it can be seen that viewing angle characteristic is remarkably improved compared with the case of FIG. 15 and the angle of a good visibility becomes about ±500.

In the device shown in FIG. 16, a liquid crystal layer, optical compensation plate 11 having a transversal retardation, and optical compensation plate 13 having a longitudinal retardation are arranged so that light passes through them in that order. However, the method for arranging optical compensation plates is not limited to such order. For instance, it is possible to make it to the order of a liquid crystal layer, optical compensation plate 13, and then optical compensation plate 11. Also, an arrangement is possible in which the order of an optical compensation plate and a liquid crystal layer is changed so that light passes through a liquid crystal layer after it passes through an optical compensation plate. Further, it is possible to arrange them in the order of optical compensation plate 11 (or optical compensation plate 13), a liquid crystal layer, and optical compensation plate 13 (or optical compensation plate 11). Devices in which optical compensation plates are symmetrically arranged before and behind a liquid crystal layer have the most excellent viewing angle characteristic. For example, it is best to arrange them in the order of optical compensation plate 13, optical compensation plate 11, a liquid crystal layer, optical compensation plate 11, and then optical compensation plate 13. However, it is desirable to adopt an arrangement as simple as possible from the view point of practical use.

It is possible to use one biaxially anisotropic optical compensation plate in place of two uniaxially anisotropic optical compensation plates shown in FIG. 16. "Biaxially anisotropic optical compensation plate" means an optical compensation plate with which all of refractive index of three main axes $n_x$, $n_y$, and $n_z$, orthogonal with one another, are different. Further, it is possible to use another vertically arranged splayed nematic liquid crystal layer which is applied or not applied with a certain driving voltage, in place of an optical compensation plate, in addition to the liquid crystal layer shown in FIG. 16.

Figure 18:
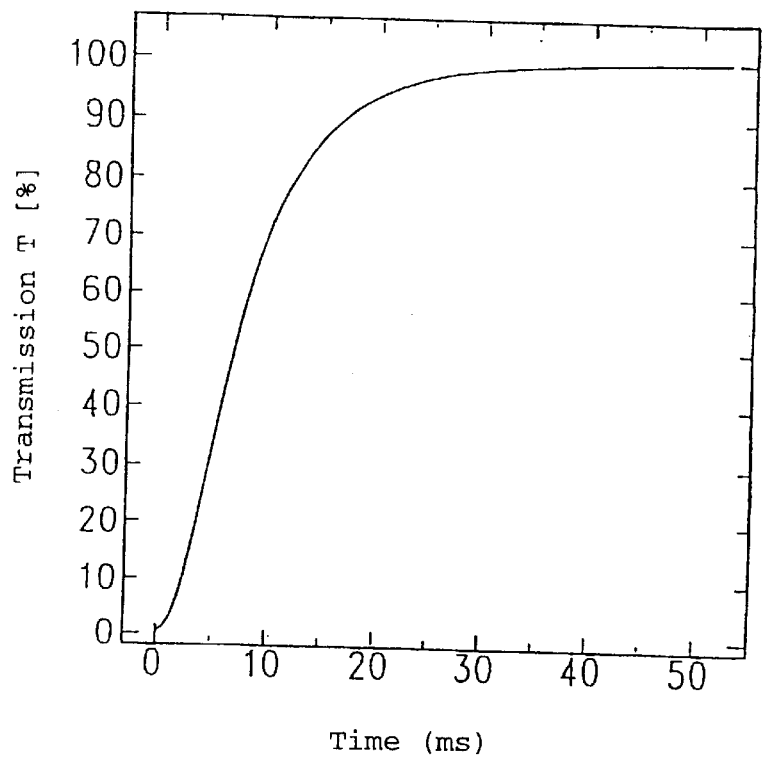
FIG. 18 is a graph showing an example of a response characteristic, at rise time, of a liquid crystal display device of the present invention.

Next, high speed response which is one of the characteristics of the liquid crystal display devices of the present invention is discussed. FIG. 18 shows an example of the results of calculation on transmission-response characteristic of a liquid crystal display device of the present invention, and indicates that a space of time in which transmission reaches to 90% after a driving voltage is applied is about 16 msec. This is high speed compared with TN type liquid crystal display devices. The fact that the display devices of the present invention have a high response speed means that the devices are suitable for displaying high speed pictures such as TV pictures.

Liquid crystal display devices described above are not driven as display device until the time when the orientation of liquid crystal molecules which are in a bend mode when driving voltage is 0 V is changed to a splay mode by the application of a driving voltage higher than critical voltage. In order to remove such inconvenience, it is permitted to fill, between substrates, a mixture of a liquid crystal with, for example, a monomer which is polymerizable by UV radiation, applying a driving voltage higher than critical voltage to orient the liquid crystal molecules in a splay mode, and then conducting a UV radiation under that state to polymerize the monomer thereby forming a network of a macromolecular compound in advance. If the devices were made once in such state beforehand, they can be driven as display device immediately after the application of a driving voltage.

Liquid crystals used in the present invention exhibit a negative dielectric anisotropy, and are compositions composed of at least three components, and at least two kind of the components are compounds having a structural portion expressed by and selected from any one of formulas 1 to 5. Specifically, they are expressed by the following general formula (A). General formula (A):

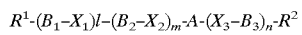

wherein $R^1$ and $R^2$ are independent with each other, and represent an alkyl or alkenyl having up to 10 carbon atoms, and one or not adjacent two $CH_2$ groups in this formula may be replaced by —O—, —COO—, or —OCO—. $B_1$, $B_2$, and $B_3$ are independent with one another, and are 1,4-phenylene ring in which one or two CH groups in the ring may be replaced by nitrogen atom, phenylene ring substituted by fluorine atom, or 1,4-cyclohexylene ring; $X_1$, $X_2$, and $X_3$ are independent with one another, and —COO—, —OCO—, —OCH$_2$—, —CH$_2$O—, —CH$_2$CH$_2$—, —C≡C—, or single bond; —A— is a structural portion expressed by and selected from any one of formulas 1 to 5; and m and n are 0 or 1 provided that the total of l, m, and n is 1, 2, or 3.

Examples of the preferable compounds are mentioned below.

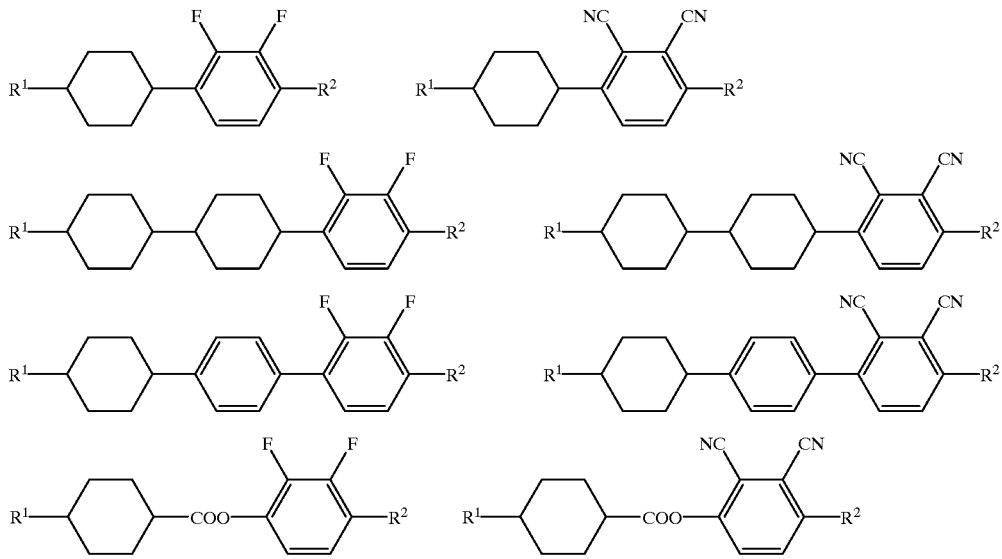

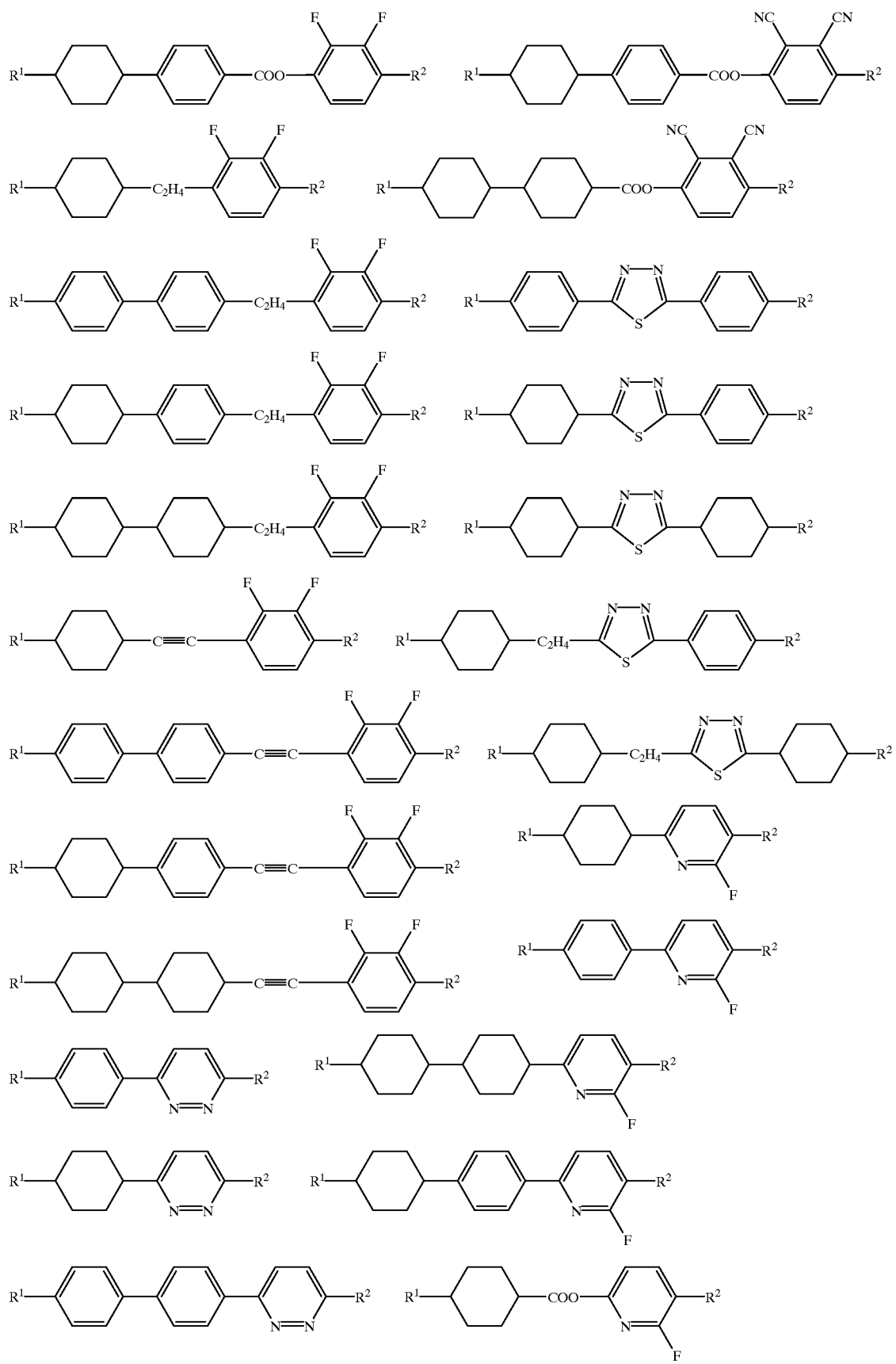

BEST MODE FOR CARRYING OUT THE INVENTION

Now, the present invention will be described in more detail with reference to Examples. However, the present invention is by no means restricted by these Examples.

EXAMPLE 1

In order to semi-vertically orient liquid crystal molecules in the vicinity of the surface of a glass substrate having a transparent electrode, n-octadecyltriethoxy silane ("ODS-E" material for vertical arrangement film, produced by Chisso Corporation) was spin-coated on a glass plate, and the surface of the coated film was subjected to a light rubbing treatment. The plate was used as substrate. Two substrates prepared by such method were used in combination in parallel arrangement as shown in FIGS. 1 and 2, and cell thickness was adjusted to 15μ m by inserting a sealing material. Liquid crystal of Composition Example 1 was filled as liquid crystal between the substrates to prepare a display device including a vertically arranged splayed nematic liquid crystal. Upper and lower polarizer plates were arranged to be −45° and ±45° relative to the plane of orientation of molecules, respectively. As optical compensation plate, only optical compensation plate 11 having a transversal retardation (Rt=750 nm) was used.

COMPOSITION EXAMPLE 1

-continued

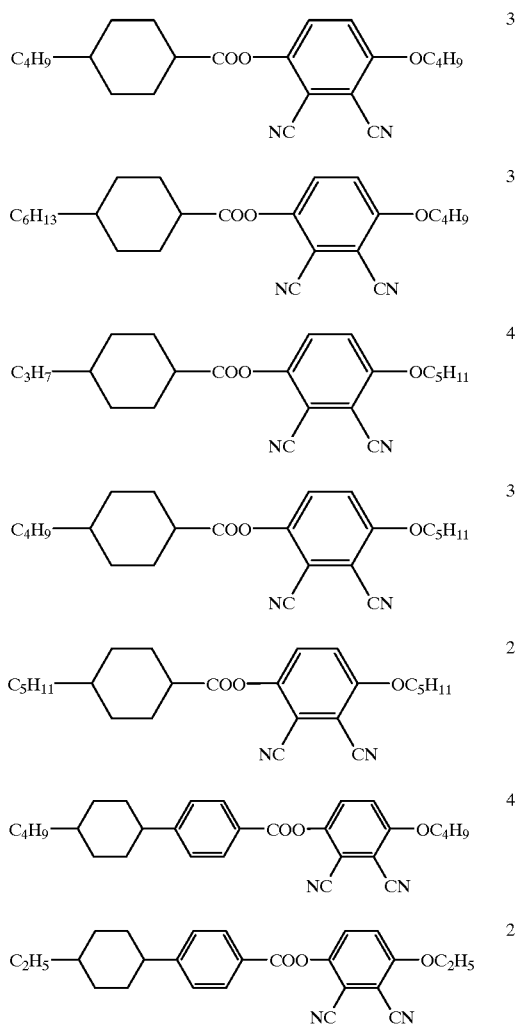

Figure 19:
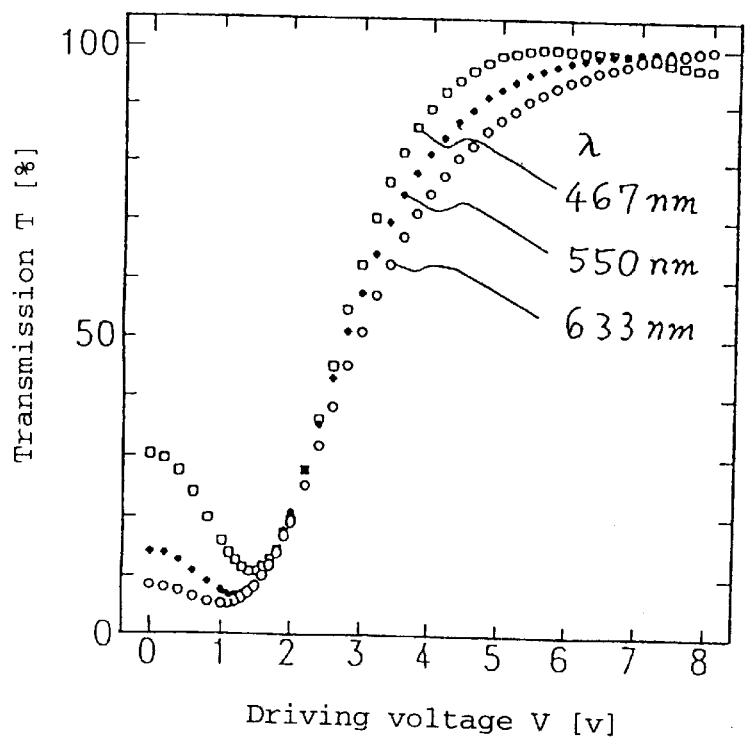
FIG. 19 is a graph showing an example of dependency of V-T characteristic on wave length in an example in which optical compensation plate 11 was used.
Figure 20:
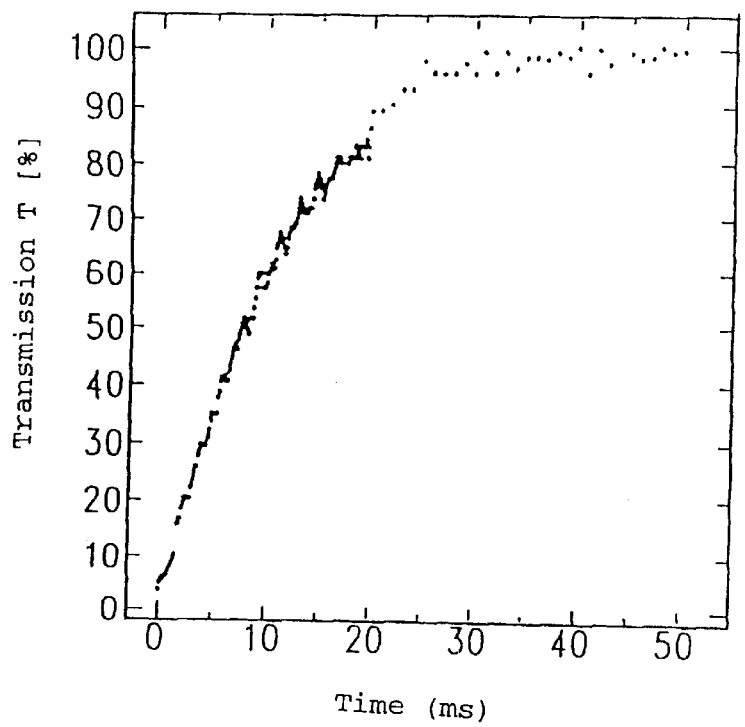
FIG. 20 is a graph showing an example of a response characteristic at rise time in an example of the present invention.
Figure 21:
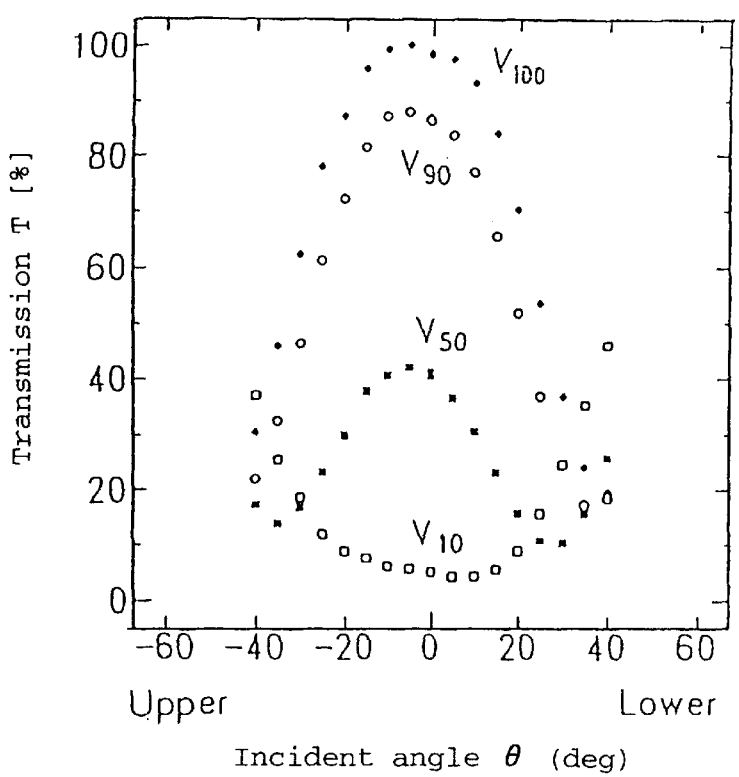
FIG. 21 is a graph showing an example of viewing angle characteristic in an example in which only optical compensation plate 11 was used.

Results of measurement of V-T characteristic when light was vertically entered into the cell are shown in FIG. 19. The results were close to those shown in FIG. 12 which were theoretically forecasted. Results of measurement of transmission-response characteristic when a step-like driving voltage was applied to the cell is shown in FIG. 20. The results were close to those shown in FIG. 18 which were theoretically forecasted, and the speed of rising time was as fast as about 20 msec. Viewing angle characteristic when light was obliquely entered into the cell is shown in FIG. 21. The results were close to those shown in FIG. 15 which were theoretically forecasted.

Physical properties of liquid crystal of Composition Example 1 were as follows:

$NI=63.3$, $\eta=39.4$, $\Delta n=0.074$, $n_0=1.491$, $n_e=1.565$, $\Delta\epsilon=-5.4$, $\epsilon\|=4.5$, $\epsilon\perp=9.9$ wherein NI represents nematic-isotropic point (° C.), $\eta$ does viscosity (mPa·sec), $\Delta n$ does optical anisotropy, $n_0$ does normal light refractive index, $n_e$ does abnormal light refractive index, $\Delta\epsilon$ does dielectric anisotropy, $\epsilon\|$ does dielectric constant in the direction of major axis, and $\epsilon\perp$ represents dielectric constant in the direction of minor axis.

EXAMPLE 2

In order to semi-vertically orient liquid crystal molecules in the vicinity of the surface of a glass substrate having a transparent electrode, n-octadecyltriethoxy silane ("ODS-E" material for vertical arrangement film, produced by Chisso Corporation) was spin-coated on a glass plate, and the surface of the coated film was subjected to a light rubbing treatment. The plate was used as substrate. Two substrates prepared by such method were used in combination in parallel arrangement as shown in FIGS. 1 and 2 to prepare a liquid crystal cell. Liquid crystal of the following Composition Example 2 was used as liquid crystal, and a display device including a vertically arranged splayed liquid crystal was prepared by the same manner as in Example 1 with the exception that upper and lower polarizer plates were arranged so that the upper polarizer was positioned at 90° relative to the lower polarizer. As the result, the same extent of good optical characteristic as in Example 1 was obtained.

COMPOSITION EXAMPLE 2

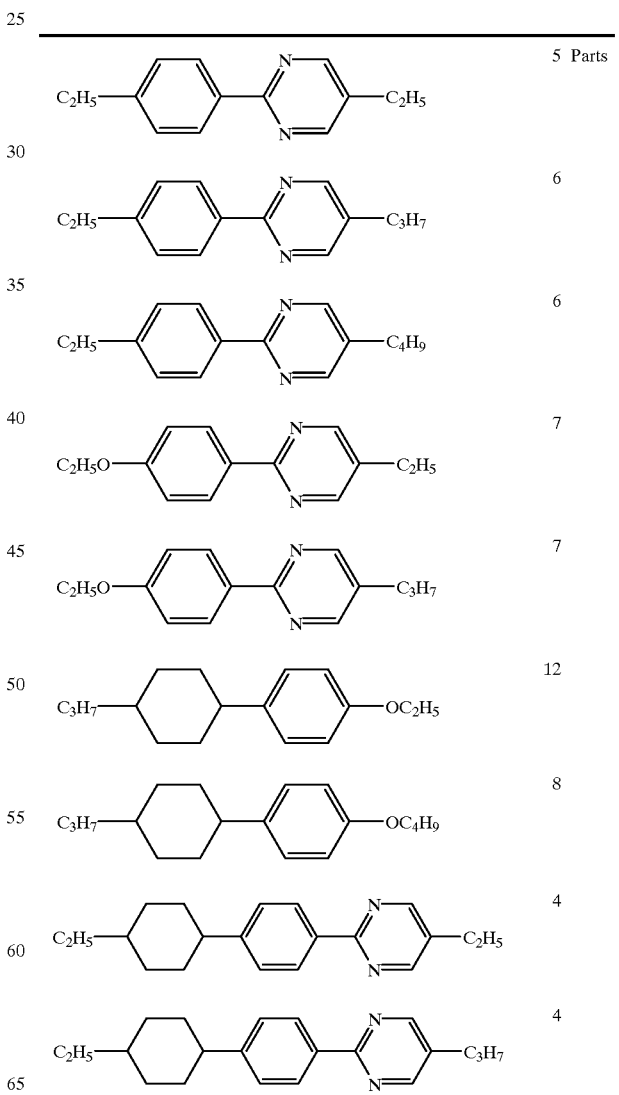

-continued

| Structure | Parts |
|---|---|
| C$_2$H$_5$—[Cy]—[Ph]—[Pyrimidine]—C$_4$H$_9$ | 4 |
| C$_3$H$_7$—[Cy]—[Ph]—[Pyrimidine]—C$_2$H$_5$ | 7 |
| C$_3$H$_7$—[Cy]—[Ph]—[Pyrimidine]—C$_3$H$_7$ | 6 |
| C$_3$H$_7$—[Cy]—[Ph]—[Pyrimidine]—C$_4$H$_9$ | 7 |
| C$_4$H$_9$—[Cy]—COO—[Ph(NC)(CN)]—OC$_4$H$_9$ | 2 |
| C$_6$H$_{13}$—[Cy]—COO—[Ph(NC)(CN)]—OC$_4$H$_9$ | 3 |
| C$_3$H$_7$—[Cy]—COO—[Ph(NC)(CN)]—OC$_5$H$_{11}$ | 4 |
| C$_4$H$_9$—[Cy]—COO—[Ph(NC)(CN)]—OC$_5$H$_{11}$ | 2 |
| C$_5$H$_{11}$—[Cy]—COO—[Ph(NC)(CN)]—OC$_5$H$_{11}$ | 2 |
| C$_4$H$_9$—[Cy]—[Ph]—COO—[Ph(NC)(CN)]—OC$_4$H$_9$ | 3 |
| C$_2$H$_5$—[Cy]—[Ph]—COO—[Ph(NC)(CN)]—OC$_2$H$_5$ | 2 |

Physical properties of liquid crystal of Composition Example 2 were as follows:

$NI$=57.4, $\eta$=47.0, $\Delta n$=0.137, $n_0$=1.655, $n_e$=1.518, $\Delta\epsilon$=−2.7, $\epsilon_\parallel$=5.9, $\epsilon_\perp$=8.6

EXAMPLE 3

Display device including a vertically arranged splayed liquid crystal was prepared by the same manner as in Example 1 with the exception that liquid crystal of Composition Example 2 was used as liquid crystal, and upper and lower polarizer plates were arranged so that the upper polarizer was positioned at 90° relative to the lower polarizer. As the result, the same extent of good optical characteristic as in Example 1 was obtained.

EXAMPLE 4

In order to semi-vertically orient liquid crystal molecules in the vicinity of the surface of a glass substrate having a transparent electrode, SiOx was first deposited by oblique evaporation on a glass substrate and then n-octadecyltriethoxy silane ("ODS-E" material for vertical arrangement film, produced by Chisso Corporation) was spin-coated thereon. Two substrates prepared by such method were used in combination in parallel arrangement as shown in FIGS. 1 and 2 to prepare a liquid crystal cell. Liquid crystal of the following Composition Example 3 was filled as liquid crystal between the substrates to prepare a display device including a vertically arranged splayed liquid crystal. Upper and lower polarizer plates were arranged so that the upper polarizer was positioned at 90° relative to the lower polarizer, and the upper polarizer plate was arranged at 45° relative to the bearing angle of liquid crystal molecules. The liquid crystal display device had the same extent of good optical characteristic as that in Example 1.

COMPOSITION EXAMPLE 3

| Structure | Parts |
|---|---|
| C$_3$H$_7$—[Cy]—[Ph]—OC$_2$H$_5$ | 19 |
| C$_3$H$_7$—[Cy]—COO—[Cy]—C$_3$H$_7$ | 19 |
| C$_3$H$_7$—[Cy]—COO—[Ph]—OCH$_3$ | 4 |
| C$_3$H$_7$—[Cy]—COO—[Ph]—OC$_2$H$_5$ | 4 |
| C$_4$H$_9$—[Cy]—COO—[Ph]—OCH$_3$ | 9 |
| C$_4$H$_9$—[Cy]—COO—[Ph]—OC$_2$H$_5$ | 7 |
| C$_5$H$_{11}$—[Cy]—COO—[Ph]—OCH$_3$ | 7 |
| C$_5$H$_{11}$—[Cy]—[Ph]—[Ph]—C$_2$H$_5$ | 6 |

-continued

C5H11—⬡—⌬—⌬—⬡—C3H7    4

C3H7—⬡—COO—⌬(NC)(CN)—OC5H11    5

C4H9—⬡—⌬—COO—⌬(NC)(CN)—OC4H9    5

C3H5—⬡—⬡—⌬(F)(F)—CH2OCH3    10

Physical properties of liquid crystal of Composition Example 3 were as follows:

NI=70.6, η=24.4, Δn=0.0847, $n_o$=1.4847, $n_e$=1.5694, Δϵ=−2.8, $\epsilon_\parallel$=3.8, $\epsilon_\perp$=6.6

EXAMPLE 5

In order to semi-vertically orient liquid crystal molecules in the vicinity of the surface of a glass substrate having a transparent electrode, SiOx was first deposited by oblique evaporation at 60° on a glass substrate and then it was further deposited by oblique evaporation at 85°. Two substrates prepared by such method were used in combination in parallel arrangement to prepare a liquid crystal cell. Liquid crystal of the following Composition Example 4 was filled as liquid crystal between the substrates to prepare a display device including a vertically arranged splayed liquid crystal. Upper and lower polarizer plates were arranged so that the upper polarizer was positioned at 90° relative to the lower polarizer, and the upper polarizer plate was arranged at 45° relative to the bearing angle of liquid crystal molecules. As the result, the same extent of good optical characteristic as in Example 1 was obtained.

COMPOSITION EXAMPLE 4

CH3OCH2—⬡—⬡—C3H7    6 Parts

CH3OCH2—⬡—⬡—C5H11    4

C3H7—⬡—⬡—COOCH3    9

C3H7—⬡—COO—⌬—OCH3    5

C3H7—⬡—COO—⌬—OC2H5    4

C4H9—⬡—COO—⌬—OCH3    9

C4H9—⬡—COO—⌬—OC2H5    9

C5H11—⬡—COO—⌬—OCH3    8

C5H11—⬡—COO—⌬—C5H11    6

C3H7—⬡—[thiadiazole]—⌬—C3H7    10

C2H5—⬡—[thiadiazole]—⌬—C4H9    10

C3H7—⌬—[thiadiazole]—⌬—C6H13    10

C2H5—⌬—[thiadiazole]—⌬—C8H17    10

Physical properties of liquid crystal of Composition Example 4 were as follows:

NI=87.0, η=31.5, Δn=0.1225, $n_o$=1.4958, $n_e$1.6183, Δϵ=−1.4, $\epsilon_\parallel$=4.8, $\epsilon_\perp$=6.2

According to the Examples described above, it was possible to prepare liquid crystal display devices having a wide viewing angle and a high response speed.

In the Examples described above, it is possible to use one or two optical compensation plates or a vertically arranged splayed nematic liquid crystal cell between two polarizer plates as discussed above to facilitate the display excellent in visibility and having an achromatic background. Whereas examples in which polarizer plates were orthogonally arranged between upper and lower plates were demonstrated above, it may be parallel. Besides, arrangement of a polarizer plate is not restricted to 45° relative to the bearing angle of liquid crystal molecules. Further, whereas electrooptical measurement by transmission was carried out in the Examples described above, if a reflector plate was used in place of a polarizer plate arranged at one side, liquid crystal display devices of the present invention can achieve the same effect even as reflection type.

INDUSTRIAL APPLICABILITY

According to the present invention, it is possible to provide liquid crystal display devices with which background is achromic and coloring is possible, and a high contrast, wide viewing angle, and high speed response can be actualized.

What is claimed is:

1. In a liquid crystal display device including a pair of substrates on the surface of which a transparent electrode and an alignment film are formed in turn, and the alignment films are arranged with a gap so that the films face each other, a liquid crystal which fills the gap, two polarizer plates holding the pair of the substrates between them, and a driving circuit connected to the transparent electrodes for applying a voltage between both substrates, the improved display device including a vertically arranged splayed nematic liquid crystal wherein a nematic liquid crystal which is substantially free from a chiral liquid crystalline compound and has a negative dielectric anisotropy is used as the liquid crystal, liquid crystal molecules in the pair of the substrates are oriented so that their molecular axis are arranged on a plane orthogonal to the substrate, liquid crystal molecules, in the vicinity of the surface of the substrates, are oriented vertically or semi-vertically so that the angle between the axis of the molecules and the substrates is in the range of 90 to 45°, and liquid crystal molecules, in other portions, are oriented so that the angle between the axis of the molecules and the substrates becomes gradually smaller as the position of the molecules approaches to the center portion of the gap between the substrates, and the axis becomes substantially parallel to the substrates in the center portion of the gap between the substrates.

2. The display device including a vertically arranged splayed nematic liquid crystal according to claim 1 wherein the transmission axis of one of the polarizer plates is arranged in the direction of substantially 45° to the plane on which the axis of the liquid crystal molecules are arranged, and the transmission axis of the other of the polarizer plates is arranged substantially parallel or right angle to the transmission axis of the one of the polarizer plates.

3. The display device including a vertically arranged splayed nematic liquid crystal according to claim 1 or 2 wherein the liquid crystal is a composition of liquid crystalline compounds comprising at least three kind of components and having negative dielectric anisotropy, and at least two kind of the components are compounds having a structural portion expressed by and selected from any one of the following formulas 1 to 5.

Formula 1

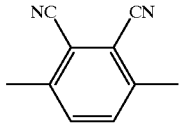

Formula 2

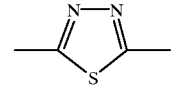

Formula 3

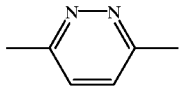

Formula 4

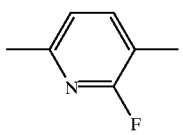

Formula 5

4. The display device including a vertically arranged splayed nematic liquid crystal according to claim 1 or 2 wherein substrates on which a film of $SiO_2$ by an oblique evaporation, a film of a polymer, or a coated film of a polysilane compound is formed at the side which faces the liquid crystal molecules, or substrates which were prepared by subjecting the film formed on the substrates defined above to a rubbing treatment are used.

5. The display device including a vertically arranged splayed nematic liquid crystal according to claim 1 or 2 wherein the device further includes optical compensating plate(s) having optical anisotropy and arranged between the polarizer plate and the substrate.

6. The display device including a vertically arranged splayed nematic liquid crystal according to claim 3 wherein substrates on which a film of $SiO_2$ by an oblique evaporation, a film of a polymer, or a film of a polysilane compound is formed at the side which faces the liquid crystal molecules, or substrates which are prepared by subjecting the film formed on the substrates defined above to a rubbing treatment are used.

7. The display device including a vertically arranged splayed nematic liquid crystal according to claim 3 wherein the device further includes optical compensating plate(s) having optical anisotropy and arranged between the polarizer plate and the substrate.

8. The display device including a vertically arranged splayed nematic liquid crystal according to claim 4 wherein the device further includes optical compensating plate(s) having optical anisotropy and arranged between the polarizer plate and the substrate.

9. The display device including a vertically arranged splayed nematic liquid crystal according to claim 6 wherein the device further includes optical compensating plate(s) having optical anisotropy and arranged between the polarizer plate and the substrate.

* * * * *